May 2, 1933. F. X. BEAUCHESNE 1,907,233
SAW SET
Filed Jan. 17, 1931
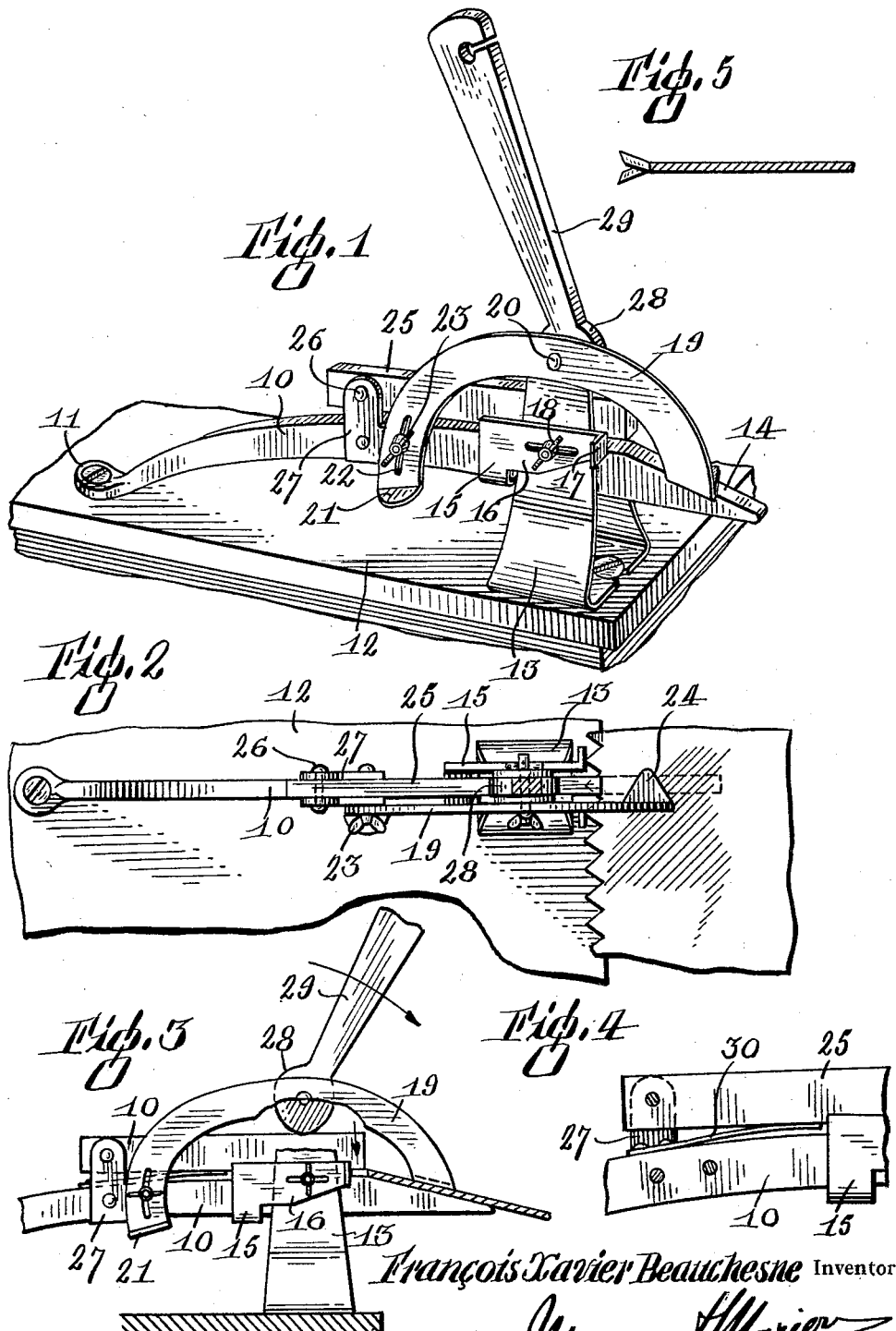

Patented May 2, 1933

1,907,233

UNITED STATES PATENT OFFICE

FRANÇOIS XAVIER BEAUCHESNE, OF BLACK LAKE, QUEBEC, CANADA

SAW SET

Application filed January 17, 1931, Serial No. 509,474, and in Canada February 13, 1930.

The present invention relates to improvements in saw set construction and has for its principal object to provide an efficient saw set of simplified structure.

A further object of the invention is the provision of a saw set designed so that the teeth of a saw will be bent at a predetermined uniform angle.

Another object of the invention is the provision of a saw set of the above character which may be quickly and conveniently operated and which will be durable in construction.

Other objects and advantages of the invention will become apparent as the description progresses.

In the accompanying drawing forming a part of this specification and in which like reference characters are employed to designate corresponding parts throughout the same:

Figure 1 is a perspective view of the assembled saw set,

Figure 2 is a top plan view of the same,

Figure 3 is a fragmentary side elevational view showing the arrangement of a saw in the device, Figure 4 is an enlarged fragmentary side elevation of the presser bar elevating means, and Figure 5 is a sectional view through a saw illustrating the arrangement of the teeth after having them set by the device.

Referring to the drawing, wherein for the purpose of illustration is shown a preferred embodiment of the invention, the numeral 10 generally designates a longitudinal stock bar having an eye 11 formed in its rear end for direct connection with a supporting table 12.

The forward portion of the stock bar 10 is supported in a substantially horizontal elevated position by means of a substantially U-shaped support bracket 13, the upper edge of the stock bar being inclined downwardly at the forward extremity to provide an anvil face 14. The intermediate portion of the stock bar 10 is supported between the upright legs of the bracket 13, having positioned thereunder a U-shaped bracket 15 provided with forwardly projecting side arms 16 having formed at the forward extremities transverse outwardly projecting gauge flanges 17. Each of the side arms 16 is provided with a longitudinally extending slot engaging a stud 18 extending laterally from the main bracket 13, the gauge bracket being locked in adjusted position by means of thumb screws 18.

Upon one side of the support bracket 13 is mounted an arcuate guide bracket 19 disposed in a vertical plane and fulcrumed upon a pivot pin 20 extending transversely through the upper portion of the bracket 13, for swinging adjustment in a vertical plane. The rear extremity of the arcuate bracket 19 is formed with an outwardly projecting tongue 21 adjacent which is formed an arcuate longitudinally extending slot 22 fitted over a stud projecting from the side of the stock bar and having disposed thereon a thumb screw 23. The forward extremity of the arcuate bracket 19 is formed with a transversely extending lip 24 disposed to overhang the inclined anvil face 14 and adjustable relative to the face by the swinging adjustment of the bracket.

Mounted in a position directly over the intermediate portion of the stock bar 10 and disposed to swing in a vertical plane co-incident therewith, is a pivoted presser bar 25 connected with a pivot pin 26 extending therethrough adjacent its rear end. The pivot pin is secured in the upstanding legs of a U-shaped bracket 27 secured to the stock bar in a rearwardly spaced position with respect to the main bracket 13.

Journaled on the upper pivot pin 20 and disposed in a vertical plane above the presser bar 25 is a cam wheel 28 having formed integral therewith a rotating lever 29. The cam wheel 28 is formed to release the presser bar 25 when the lever 29 is swung rearwardly and to firmly press the bar downwardly onto the stock when the lever is swung forwardly.

The vertically pivoted presser bar 25 is normally urged to an elevated position by means of a spring 30 having its rear end secured to the stock while its forward end contacts with the presser bar to raise the same.

In use, a saw is positioned upon the inclined anvil face 14 and slidably moved in a transverse manner thereover. The saw teeth are disposed to extend beyond the inner end of the inclined face and are bent to provide a set of predetermined angle by swinging the lever 29 forwardly, causing the forward end of the presser bar 25 to engage a tooth of the saw and to bend the same over onto the horizontal surface of the stock, the angular arrangement of the teeth being determined by the setting of the bracket member 19, by means of which the lip 24 is elevated or lowered with respect to the anvil face. The maximum set obtainable is determined by the angle of the anvil 14 when the saw is resting thereon and pressed thereagainst by the lip 24; however, if said lip is raised from the surface of the saw, said saw is free to lift slightly from the anvil when a pressure is applied to bend a tooth, inasmuch as the force required to bend said tooth is generally greater than that required to lift the blade of the saw from the anvil 14. Therefore, the lip 24 acts as a stop to prevent upward movement of the saw blade when a bending moment is applied to a tooth. This simple arrangement effectively answers all the requirements inherent to saw setting and enables saws of varying thicknesses to be set with one simple adjustment. The position of the saw on the anvil face of the stock is also regulated by longitudinal adjustment of the gauge bracket 15 so as to establish a predetermined bending line of the teeth.

During the initial operation, alternate teeth of the saw are set as described in the foregoing. Upon completion of this operation, the saw is turned in reverse position for uniformly setting the remaining teeth, thereby simply and effectively obtaining the necessary set of the teeth.

It is to be understood that the form of my invention herein shown and described is to be taken as a preferred example of the same, and that various changes as to the shape, size, and arrangement of parts may be resorted to without departing from the spirit of the invention or the scope of the subjoined claim.

Having thus described my invention, I claim:—

In a saw set, a longitudinal stock bar supported in an elevated position having its upper surface formed to provide a horizontal face intermediate its end and an inclined face on the forward end portion, the said inclined face of the stock bar being disposed to support a saw in transverse inclined arrangement thereon, a vertically swinging presser bar mounted over the horizontal face of the stock bar and having its free end terminating above the intersection of the horizontal and inclined faces thereof, a rotatable cam wheel mounted above the presser bar and disposed to press the same firmly upon the stock bar in one position and to release the same in an opposed position, a longitudinally adjustable gauge engageable with the saw teeth adapted to govern the depth of the saw set, and a vertically adjustable gauge having a projection extending over the inclined face of the stock bar to limit the lifting movement of the saw and thus govern the angle of the saw set.

In witness whereof I have hereunto set my hand.

FRANÇOIS XAVIER BEAUCHESNE.